Aug. 26, 1924.
R. D. BANE ET AL
WELL RIG TRAVELING BLOCK
Filed May 19, 1923
1,506,040
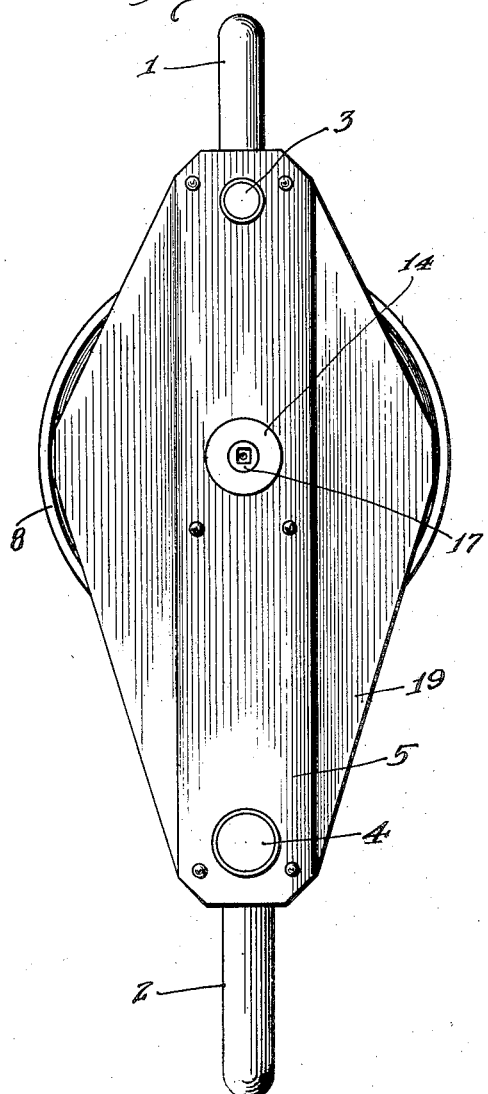
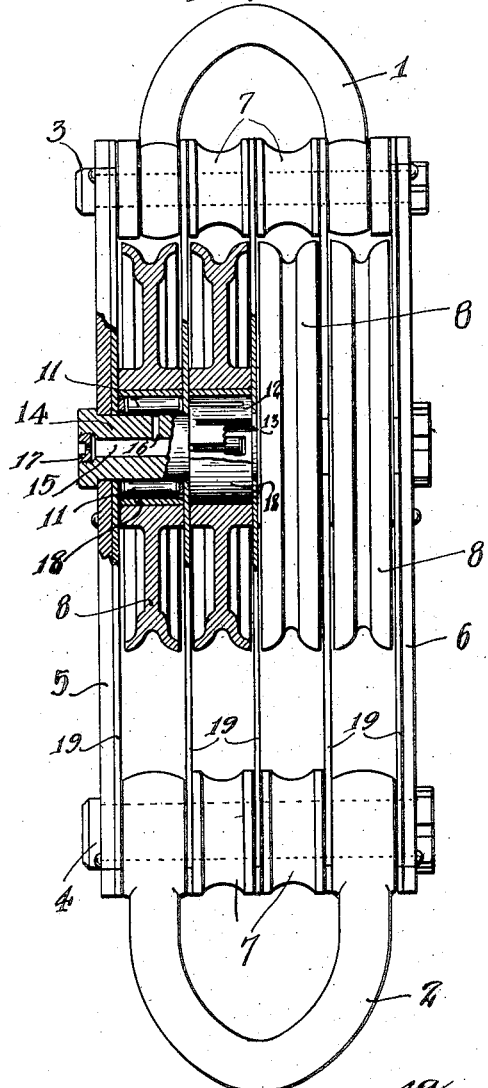
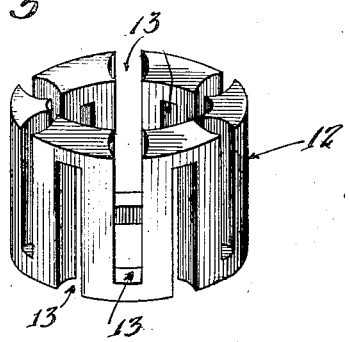
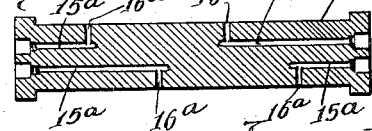
Inventors.
Robert D. Bane
Edwin W. Goeser
By Lyon & Lyon Atty.

Patented Aug. 26, 1924.

1,506,040

UNITED STATES PATENT OFFICE.

ROBERT D. BANE, OF LONG BEACH, AND EDWIN W. GOESER, OF TORRANCE, CALIFORNIA; SAID GOESER ASSIGNOR TO UNION TOOL COMPANY, OF TORRANCE, CALIFORNIA, A CORPORATION OF CALIFORNIA.

WELL-RIG TRAVELING BLOCK.

Application filed May 19, 1923. Serial No. 640,130.

*To all whom it may concern:*

Be it known that we, ROBERT D. BANE and EDWIN W. GOESER, citizens of the United States, residing at Long Beach and Torrance, respectively, in the county of Los Angeles and State of California, have invented a new and useful Well-Rig Traveling Block, of which the following is a specification.

This invention relates to traveling blocks of the type used in oil wells for raising or lowering the drill pipe and casing.

Hitherto the traveling blocks employed in raising or lowering drill pipe and casing have been provided with plain bushings for mounting the rotating sheaves on their axis. Such traveling blocks are subjected to very heavy loads and receive considerable rough handling. The traveling blocks hitherto used develop considerable friction in use with a corresponding high rate of wear.

An object of this invention is to provide a traveling block with an anti-friction bearing adjusted to decrease the friction attendant with such prior traveling blocks which anti-friction bearing is both economical in construction and adapted to withstand the heavy loads and rough handling normally received by such traveling blocks as are now employed in oil well work.

Another object of this invention is to provide a traveling block with anti-friction bearings having a communicating lubricant reservoir so that the anti-friction bearings are at all times thoroughly lubricated resulting in a decrease of friction and wear of the traveling block.

Another object of this invention is to provide a traveling block with anti-friction bearings having a communicating lubricant reservoir adapted to be filled with heavy grease under pressure and in which the grease may be inserted under pressure from a grease gun without disassembling the traveling block.

Another object of this invention is to provide an anti-friction traveling block with cylindrical mounting roller bearings and a cage retainer for maintaining the bearings in alinement.

Another object of this invention is to provide a traveling block with cylindrical mounting rolled bearings so held in alinement by a cage retainer that an anti-friction mounting is provided along the entire width of the sheave. This construction provides a freely floating traveling block capable of slight axial shifting which is a feature of considerable value and aids in retaining the line on the sheaves.

Another object of this invention is to provide an anti-friction traveling block with sheaves having replaceable bushing engaging the anti-friction bearings.

Another object of this invention is to provide a traveling block in which the sheave mounting shaft is above the center of gravity of the traveling block so that an overbalanced traveling block is produced which will tend to avoid up-setting tangling and damaging of the line, in operation.

Additional objects and advantages of this invention will appear from the following description of the accompanying drawings, which illustrate the invention in the preferred embodiment, in which—

Figure 1 is a vertical elevation of a traveling block embodying the invention.

Fig. 2 is an elevation at right angles to Figure 1 partially in section to disclose the assemblage of the anti-friction bearings.

Fig. 3 is a perspective view of the roller bearing cage retainer.

Fig. 4 is a longitudinal section of a modified form of shaft for mounting the sheaves.

Referring to the drawings the traveling block comprises an upper bail 1, journaled on a horizontally disposed shaft 3, and a lower bail 2 journaled on a second horizontally disposed shaft 4. Side plates 5 and 6 extend vertically on each side of the block and support the horizontally disposed shafts 3 and 4. 7 indicates a plurality of spacing spools rotatably mounted on the shafts 3 and 4 between the journaled ends of the bails 5 and 6 and serve to prevent entangling of the hoisting line when the traveling block is in use. A sheave mounting shaft 14 is horizontally supported at each end by the side plates 5 and 6, and positioned thereon substantially above the center of gravity of the traveling block to provide a preponderance of weight below the shaft 14 for preventing upsetting of the traveling block.

Cylindrical horizontally disposed rolled bearings 11 are mounted in alinement on the shaft 14 by cylindrical cage retainers 12. In this embodiment of the invention four of such cage retainers 12 are mounted in axial alinement on the shaft 14 supporting an equal number of separately rotating sheaves 8.

Each cage retainer 12 is provided with staggered horizontal bores 13 substantially equal in length and diameter to the cylindrical bearings 11 whereby such bearings may be inserted into the cage retainers from opposite sides, each alternate cylindrical bearing 11 thereby extending substantially flush with one side of the cage retainer 12 providing an anti-friction bearing along the entire width of the engaging sheave 8.

The sheave mounting shaft 14 is axially bored to provide a lubricant reservoir 15 which communicates with the cylindrical roller bearings through radial ducts 16. Screw plugs 17 close the ends of the lubricant reservoir 15 and may be removed to fill the reservoir 15 with heavy grease from a suitable grease gun (not shown). Preferably the sheaves 8 are provided with replaceable bushings 18 engaging the cylindrical rollers. A diaphragm plate 19 is positioned each side of each of the sheaves 8 and is apertured to permit shafts 3, 4 and 14 to pass therethrough.

The traveling block is thus provided with anti-friction bearings of economical and sturdy construction adapted to withstand heavy loads and rough handling. Each of the sheaves is provided with a maximum anti-friction bearing engagement which may be thoroughly lubricated by grease packed in the reservoir 15 under pressure. The cage retainers 12 are formed economically and integral in construction. The sheaves 8 are freely floating on the shaft 14 and slightly axially shiftable to assist in retaining the hoisting line thereon. The bushings 18 may be replaced if worn and the traveling block has preponderance of weight below the sheave mounting shaft 14 so that the block does not readily upset and tangle or damage the line in use.

Referring to Figure 4, $4^a$ indicates a shaft which may be employed in the traveling block in place of the shaft 4 of Figs. 1—3 inclusive. Said shaft $4^a$ is provided with separate reservoirs $15^a$, one for each sheave to be mounted on the shaft. A radial duct $16^a$ communicates with each reservoir $15^a$, for connecting the different reservoirs to independent sheaves. Each sheave may thus be separately lubricated by grease supplied under pressure.

The traveling block theretofore described is an illustrating example of a practical embodiment of the invention which is not limited to the example described for illustrating the invention, but is of the scope set forth in the accompanying claim.

In a well rig traveling block, the combination with an upper and lower bail and interconnecting side plates, of a rotatable sheave supporting shaft mounted on said side plates, a plurality of spaced diaphragms through which the shaft extends, roller bearing retainer cages mounted on the shaft between the diaphragms and having bearing receiving ways opening at alternate sides of the cages, continuous cylindrical rollers mounted in the cages between the diaphragms, radial ducts extending from the roller bearings to within the shaft and communicating through the shaft for lubricating the roller bearings, and sheaves mounted on the bearings.

Signed at California this 3rd day of May, 1923.

ROBERT D. BANE.
EDWIN W. GOESER.